United States Patent
Hung et al.

(10) Patent No.: US 9,024,761 B2
(45) Date of Patent: May 5, 2015

(54) SYSTEM AND METHOD FOR PERSISTENT ID FLAG FOR RFID APPLICATIONS

(75) Inventors: Cheng-Hsien Hung, Taoyuan (TW); Yu-Ling Lin, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1124 days.

(21) Appl. No.: 12/636,507

(22) Filed: Dec. 11, 2009

(65) Prior Publication Data

US 2010/0238000 A1 Sep. 23, 2010

Related U.S. Application Data

(60) Provisional application No. 61/160,838, filed on Mar. 17, 2009.

(51) Int. Cl.
*G08B 13/14* (2006.01)
*G06K 19/077* (2006.01)

(52) U.S. Cl.
CPC .................................. *G06K 19/07749* (2013.01)

(58) Field of Classification Search
CPC . G06K 19/067; G06K 19/07; G06K 19/0701; G06K 19/0707; G06K 19/0709; G06K 19/0715; G06K 19/0723; G06K 19/073; G06K 19/07309; G06K 19/07363; G06K 19/07449; G11C 5/005; G11C 5/142; G11C 7/00; G11C 7/12; G11C 11/00; G11C 11/21; G11C 11/22; G11C 11/221; G11C 11/223; G11C 11/225; G11C 11/2275; G11C 11/2295; G11C 11/24; G11C 11/34; G11C 11/35
USPC ................... 340/572.1–572.9, 657, 660–663, 340/10.1–10.6
See application file for complete search history.

(56) References Cited

U.S. PATENT DOCUMENTS

| | | | | |
|---|---|---|---|---|
| 4,216,390 A * | 8/1980 | Stewart | ............................ | 326/81 |
| 5,058,063 A * | 10/1991 | Wada et al. | ............... | 365/185.18 |
| 5,392,243 A * | 2/1995 | Nakamura | ..................... | 365/190 |
| 6,259,627 B1 * | 7/2001 | Wong | ........................ | 365/185.21 |
| 6,473,338 B2 * | 10/2002 | Sugimura | ............... | 365/185.03 |
| 6,535,026 B2 * | 3/2003 | Chung et al. | .................... | 327/51 |
| 7,092,307 B2 * | 8/2006 | Chen et al. | ..................... | 365/226 |
| 7,116,240 B2 | 10/2006 | Hyde | | |
| 7,366,035 B2 * | 4/2008 | Watanabe | ................. | 365/189.09 |
| 7,424,265 B2 * | 9/2008 | Umeda et al. | ................ | 455/41.1 |
| 7,427,912 B1 * | 9/2008 | Heinrich et al. | ............ | 340/10.34 |
| 7,583,180 B2 * | 9/2009 | Sato | ............................ | 340/10.51 |
| 7,710,798 B2 * | 5/2010 | Pillai | .............................. | 365/192 |
| 7,728,713 B2 * | 6/2010 | Stewart | ........................ | 340/10.4 |
| 7,746,216 B2 * | 6/2010 | Ziebertz | ..................... | 340/10.34 |
| 8,130,082 B2 * | 3/2012 | Kang | .......................... | 340/10.51 |
| 8,410,910 B2 * | 4/2013 | Naura et al. | ................ | 340/10.51 |
| 2003/0183699 A1 * | 10/2003 | Masui | ............................ | 235/492 |
| 2006/0164215 A1 * | 7/2006 | Kofler | ......................... | 340/10.51 |
| 2007/0171693 A1 * | 7/2007 | Koyama | ......................... | 365/145 |

* cited by examiner

*Primary Examiner* — Steven Lim
*Assistant Examiner* — Ryan Sherwin
(74) *Attorney, Agent, or Firm* — Slater & Matsil, L.L.P.

(57) ABSTRACT

A system and method for persistent ID flag for RFID applications includes a method for operating an RFID tag. The method includes measuring a voltage potential of a supply voltage for the RFID tag, and turning on a pass gate that couples a memory cell to a data line used for reading or writing data, if the voltage potential is greater than a first threshold. An accumulated charge on the memory cell is also measured, and both the voltage potential and the accumulated charge are used to generate a control signal to set a state of the pass gate. The pass gate is turned off if the control signal is a true value.

20 Claims, 8 Drawing Sheets

SYSTEM AND METHOD FOR PERSISTENT ID FLAG FOR RFID APPLICATIONS

This application claims the benefit of U.S. Provisional Patent Application Ser. No. 61/160,838, filed on Mar. 17, 2009, and entitled "System and Method for Persistent ID Flag for RFID Applications," which application is incorporated herein by reference.

TECHNICAL FIELD

The present invention relates generally to radio frequency identification (RFID) devices, and more particularly to a system and method for persistent ID flag for RFID applications.

BACKGROUND

In general, RFID is a system that allows for automatic identification of RFID tags and things attached thereto. An RFID system usually includes a number of RFID tags that may be used to identify and/or track objects, persons, animals, products, inventory, and so forth, and at least one RFID reader that may be used to detect and read RFID tags. Typically, there may be two types of RFID tags: active RFID tags that contain a power source (a battery, for example) and passive RFID tags that do not contain a power source, but derives its power from received transmissions of an RFID reader.

Since passive RFID tags do not contain a power source and derive their power from received transmissions, the passive RFID tags will typically not be able to derive any power to operate when transmissions are not received. Therefore, volatile information, such as data stored in dynamic memory memories, including dynamic random access memory, registers, latches, so on, for example, will be lost after transmissions are no longer received at the passive RFID tags, resulting in a loss of power.

Figure 1:
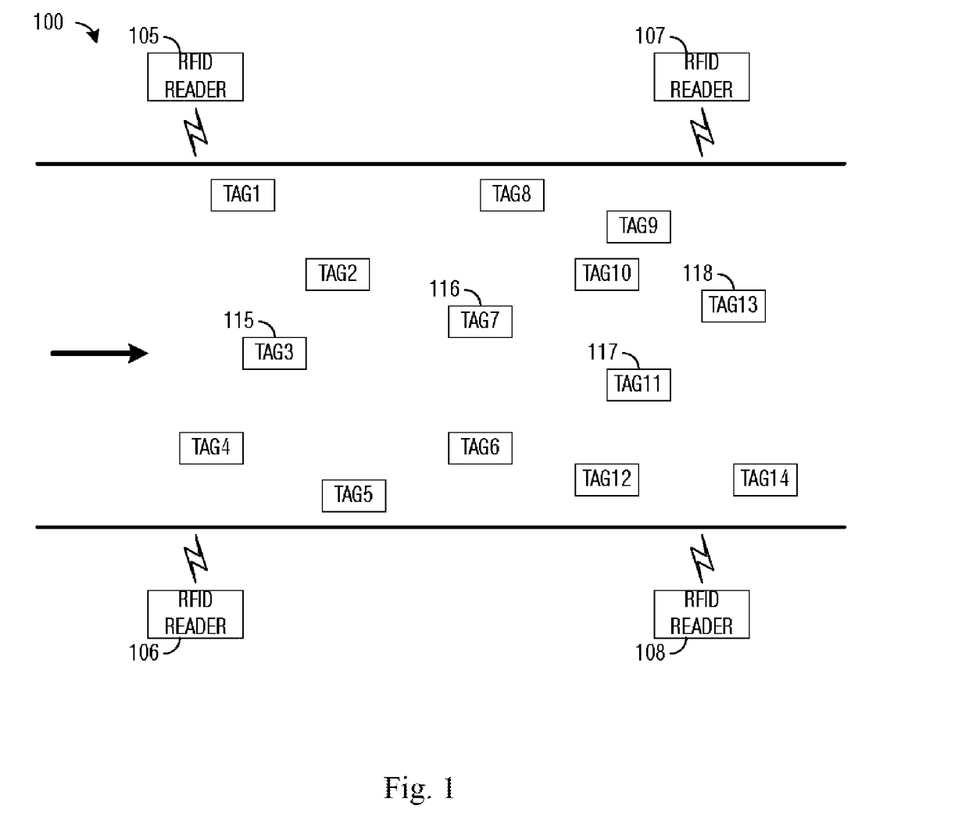
FIG. 1 is a diagram of an inventor system.

FIG. 1 illustrates a diagram of an inventory system 100 utilizing RFID tags and RFID readers, wherein loss of volatile information may impact the performance of inventory system 100. Inventory system 100 includes a number of RFID readers 105-108 that may be used to identify and track inventory. The inventory may include individual product units or pallets of products, with each unit or pallet containing one or more passive RFID tags. A passive RFID tag included with a unit or pallet may contain information pertaining to the unit or pallet, such as identification number, content, count, and so forth. As shown in FIG. 1, only passive RFID tags, such as RFID tag "TAG3" 115, "TAG7" 116, "TAG11" 117, and "TAG13" 118, are shown. The actual product or pallets containing the passive RFID tags are not shown to maintain simplicity.

A first time an RFID tag, such as TAG3 115, passes within range of an RFID reader, such as RFID reader 105, transmissions by RFID reader 105 may energize TAG3 115. This may enable TAG3 115 to respond to inquiries made by RFID reader 105. Part of the communication process between RFID reader 105 and TAG3 115 may include a handshake operation that may include identification of TAG3 115, entry of TAG3 115 into inventory system 100, marking TAG3 115 as an RFID tag that has been identified by inventory system 100, and so on. The handshake operation may take a finite amount of time.

After TAG3 115 completes its handshake operation with RFID reader 105, TAG3 115 may provide information about product content, product identification information, product count, intended destination, and so forth, to RFID reader 105 depending on inquiries from RFID reader 105. Based on the information retrieved from TAG3 115, inventory system 100 may direct the movement of TAG3 115 and product units or pallet of product to which it is attached.

In order to help with the performance of inventory system 100, a record of TAG3 115 already establishing communications with inventory system 100 may be stored in both inventory system 100 as well as TAG3 115. This may prevent TAG3 115 from having to repeatedly perform the handshake operation as well as responding to information requests from RFID readers in inventory system 100 as it moves along in inventory system 100. However, since TAG3 115 is a passive RFID tag, once TAG3 115 moves outside of communications range of RFID reader 105, it may no longer be able to derive power needed to maintain volatile information stored therein. Therefore, it may be possible that by the time that TAG3 115 passes within range of RFID reader 107, for example, the volatile information may have disappeared, and TAG3 115 may need to repeat the handshake operation as well as respond to information requests. This may impact performance of inventory system 100. Therefore, there is a need to maintain the volatile information stored in a passive RFID tag for a period of time after power is no longer available to the passive RFID tag. For example, in order to help prevent loss of volatile information due to unexpected power shielding or power interruption during a handshaking operation with an RFID reader, RFID technical specifications specify that a passive RFID tag should be able to maintain the volatile information for about two (2) seconds.

Figure 2A:
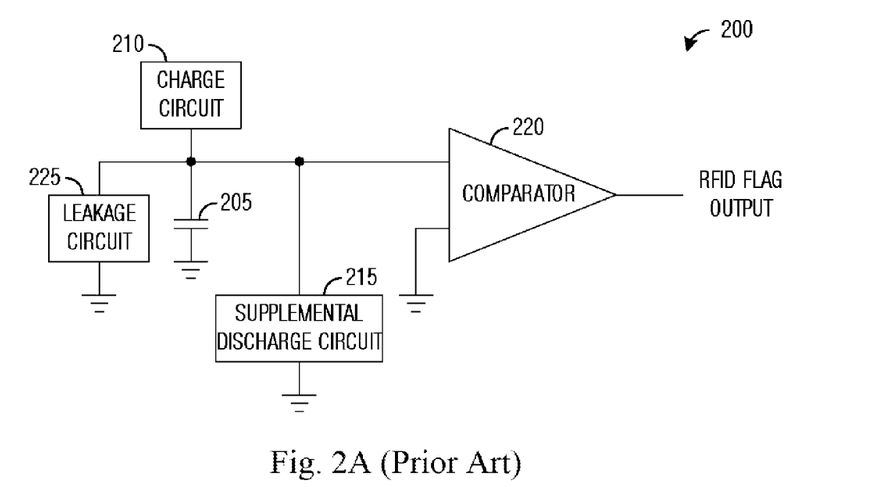
FIG. 2a is a block diagram of a prior art circuit used to maintain volatile information in a passive RFID tag.

FIG. 2a illustrates a prior art technique for maintaining volatile information in a passive RFID tag 200. RFID tag 200 includes a capacitor 205 that is used to store the volatile information (a single bit as shown in FIG. 2a). The volatile information may be written to capacitor 205 by a combination of charge circuit 210 and supplemental discharge circuit 215. A comparator 220 may compare a charge stored on capacitor 205 with electrical ground to determine a value of the volatile information stored in passive RFID tag 200. A leakage circuit 225 may be used to maintain the volatile information when passive RFID tag 200 is not powered.

Figure 2B:
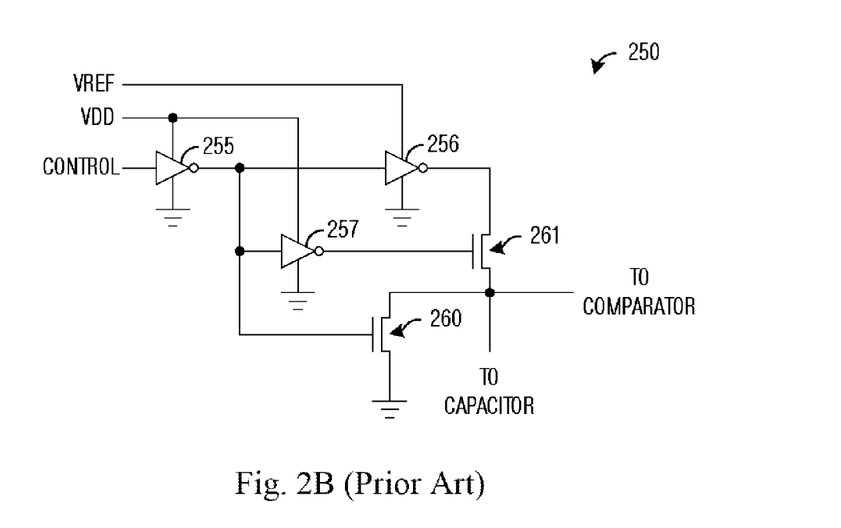

FIG. 2b illustrates a circuit 250 that is an embodiment of the prior art technique for maintaining volatile information shown in FIG. 2a. Circuit 250 includes a plurality of CMOS inverters 255-257 to control NMOS gates 260 and 261. NMOS gate 261 may be an implementation of charge circuit 210 and CMOS inverter 256 may be used to keep leakage current low during power up. VREF powers CMOS inverter 256, while VDD powers CMOS inverter 257. When VDD is sufficiently higher than VREF, a capacitor used to store the volatile information is charged to VREF. A discharge path through NMMOS gate 260, different from the charge path, may allow for a discharge of the capacitor. The volatile information stored in the capacitor may be maintained by opening NMOS gates 260 and 261 when power is lost.

SUMMARY OF THE INVENTION

These and other problems are generally solved or circumvented, and technical advantages are generally achieved, by embodiments of a system and a method for persistent ID flag for RFID applications.

In accordance with an embodiment, a method for operating a radio frequency identification (RFID) tag is provided. The method includes measuring a voltage potential of a supply voltage of the RFID tag, turning on a pass gate in response to determining that the voltage potential is greater than a first threshold, measuring an accumulated charge on the memory cell, setting a control signal to a value based on the voltage potential and the accumulated charge, and turning off the pass gate in response to determining that the control signal is equal to a true value. The pass gate selectively couples a memory cell of the RFID tag to a data line used for reading or writing of data.

In accordance with another embodiment, a method for writing information in a radio frequency identification (RFID) tag is provided. The method includes setting a supply voltage for a data writing mechanism based on a value of the information being written, setting a data voltage for the data writing mechanism based on the value of the information being written, and enabling the data writing mechanism to write the information.

In accordance with another embodiment, a radio frequency identification (RFID) tag is provided. The RFID tag includes an analog front end, a digital section coupled to the analog front end, and a data persistence circuit coupled to the digital section. The analog front end processes signals received by an antenna, and derives power for the RFID tag from the received signals. The digital section provides computational operations, and the data persistence circuit preserves data stored therein for a duration without power. The data persistence circuit couples a memory store in the data persistence circuit to a data line used for reading or writing of data based on a voltage potential of a supply voltage and an accumulated charge in the memory store.

An advantage of an embodiment is that the use of a dual-level power system helps to ensure that the reading and writing of volatile information is robust.

A further advantage of an embodiment is that a power level detection system is included to help prevent loss of data due to unexpected loss of power.

Yet another advantage of an embodiment is that once sufficient charge is accumulated, the storage of the volatile information stops, thereby helping to ensure that the volatile information is not corrupted by an unexpected loss of power and that a desired persistence of the volatile information is achieved.

Another advantage of an embodiment is that the use of a single read/write (charge & discharge) path (DRAM-like Pass Gate) may lower the risk of data lost and extend the persistence time when compared with the prior art.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 2b is a diagram of a circuit that is an embodiment of the prior art circuit shown in FIG. 2a;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a passive RFID tag with a desired RFID data register persistence of two (2) or more seconds. The invention may also be applied, however, to other passive RFID tags with other desired persistence values. Additionally, the invention may also be applied to other applications wherein there is a desire to maintain volatile information for a specified amount of time without having to provide a power supply.

Figure 3:
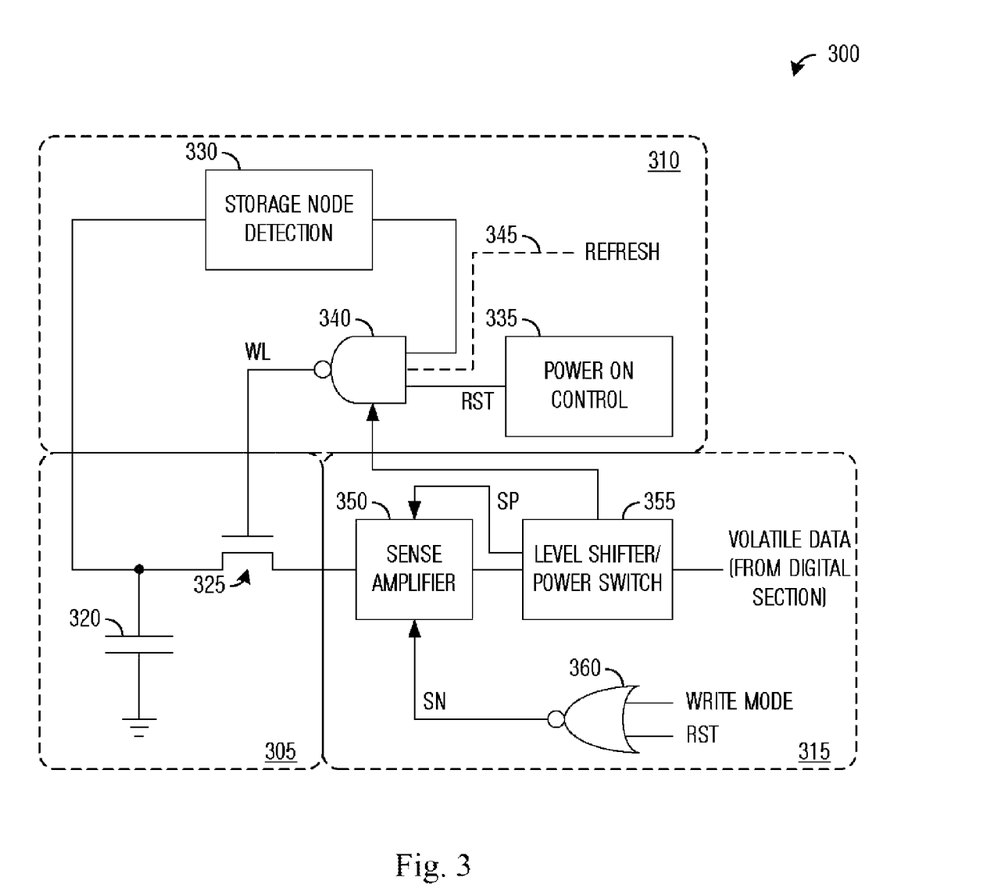
FIG. 3 is a diagram of a circuit for use in storing volatile information in a passive RFID tag.

FIG. 3 is a diagram of a circuit 300 for use in storing volatile information in a passive RFID tag. Circuit 300 may be used to store volatile information, such as RFID persistent flag data, in a passive RFID tag. As shown in FIG. 3, circuit 300 may be used to store a single bit of volatile information, however, multiple instantiations of circuit 300 may be used to store multiple bits of volatile information.

The volatile information stored in circuit 300 may persist for a period of time (referred to as persistence time), for example, two (2) seconds, after power has been removed from a passive RFID tag containing circuit 300. Although a persistence time of about two seconds is discussed, typical persistence times may range from 500 ms to 5 seconds. The persistence of volatile information may help to improve performance of an RFID system that includes the passive RFID tag since the persistence of the volatile information may help to eliminate a need to repeat operations, such as handshake operations, information inquiries, and so forth, which have already occurred.

In order to help ensure that volatile information stored in circuit 300 persists for a desired persistence time as well as maintaining the integrity of the volatile information, several actions may need to take place. A first action involves detecting and cutting off current leakage paths from a memory used to store the volatile information when power is not being provided to circuit 300. A second action involves detecting when sufficient charge has accumulated in the memory during a write operation and may safely be cut off. A third action involves using boosted voltage potentials during certain write operations to help ensure integrity of the volatile information as it is being written to the memory.

Circuit 300 includes a dynamic random access memory (RAM)-like memory cell 305 that may be used to store the volatile information, a data keep control system 310, and a data read/write system 315. Data keep control system 310 may be used to detect a charge present in memory cell 305 as well as generating a control signal for turning on or turning off a read/write path to memory cell 305. The control signal used for turning on or turning off the read/write path to memory cell 305 may be based on factors such as a magnitude of a charge accumulated in memory cell 305, a state of a reset signal (RST), voltage potential of a power rail (VDD, for example), and so forth.

Data read/write system 315 may be used to store (write) the volatile information to memory cell 305 and retrieve (read) the stored volatile information from memory cell 305. Data read/write system 315 may operate differently depending on the volatile information's value to help prevent corruption of the volatile information, for example. Data read/write system 315 may also prevent a data read/write operation from taking place depending on control signals, such as an enable signal.

Memory cell 305 may be a typical one-transistor, one-capacitor (1T1C) memory cell and includes a capacitor 320 that may be used to store charge representative of the volatile information. Capacitor 320 may be implemented as a metal-insulator-metal (MiM) capacitor, but other capacitor types may be used. The size of capacitor 320 may be based on factors such as desired persistence time, fabrication technology, size limitations, and so forth. A typical range of capacitor 320 capacitances may be from 0.2 to 2 pF, with a typical value being about 1 pF.

In general, the larger the value of capacitor 320, the longer the persistence time. However, an effective design should take production cost (size and area) into consideration. While capacitor 320 with a large capacitance would easily meet the persistence time requirement, it may be too large physically. Therefore, a size limitation may be placed on capacitor 320. For example, depending on fabrication process technology, capacitor 320 should not be larger than 20 um×20 um, which when fabricated using current fabrication process technologies may yield a capacitance ranging from around 0.2 to about 2 pF.

Memory cell 305 also includes a transistor 325. Transistor 325 may be used as a pass gate to turn on or turn off a read/write path to capacitor 320. Preferably, transistor 325 may be implemented as an N-type field effect transistor (FET) with a high threshold voltage (HVT). As a HVT transistor, transistor 325 may have a low leakage current, which may help increase a discharge time of capacitor 320. With an increased discharge time, capacitor 320 may maintain a correctly detectable charge for a longer amount of time. If a transistor with a low threshold voltage is used, then when transistor 325 is turned off, the accumulated charge in capacitor 320 may dissipate more rapidly, potentially making it more difficult to meet the desired persistence time.

Data keep control system 310 includes a storage node detection unit 330, a power on control unit 335, and a logic gate 340. Storage node detection unit 330 may be used to detect an amount of charge accumulated on capacitor 320 of memory cell 305. Storage node detection unit 330 may provide an output that becomes active when the accumulated charge on capacitor 320 reaches a specified amount. An active output from storage node detection unit 330 may be used to turn off transistor 325, turning off the read/write path to capacitor 320. In other words, storage node detection unit 330 may determine when sufficient charge has accumulated on capacitor 320 and turn off transistor 325 to prevent unexpected power lost from impacting the accumulated charge on capacitor 320.

Storage node detection unit 330 may be applicable with the second action discussed previously that may be needed for ensuring that the volatile information persists for the desired persistence time. Alternatively, storage node detection unit 330 may provide an output that is proportional to the accumulated charge on capacitor 320.

Figure 4A:
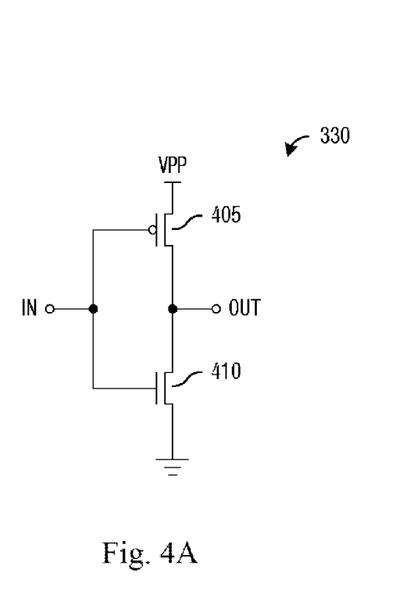
FIG. 4a is a diagram of a storage node detection unit.

FIG. 4a provides a detailed view of an embodiment of storage node detection unit 330. Storage node detection unit 330 comprises a pair of FETs arranged serially with their gate terminals coupled together. Storage node detection unit 330 includes a first FET 405, which may preferably be a PFET with a low threshold voltage, and a second FET 410, which may preferably be a thick oxide NFET. An input of storage node detection unit 330 may be coupled to capacitor 320 and transistor 325 of memory cell 305, with an output of storage node detection unit 330 asserting a true value when an accumulated charge on capacitor 320 reaches a specified value.

Figure 4B:
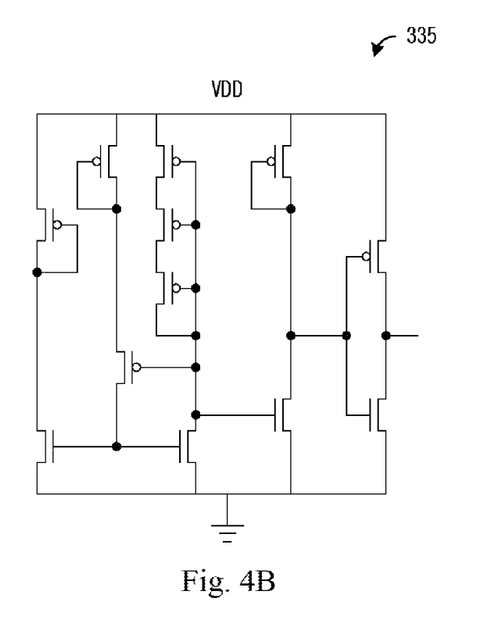
FIG. 4b is a diagram of a power on control unit.

Referring back now to FIG. 3, data keep control system 310 also includes a power on control unit 335. Power on control unit 335 may be used to detect voltage potential of a supply voltage, such as supply voltage VDD, and to make a comparison between the detected voltage potential and a reset signal trigger point, producing the reset signal RST based on the comparison. For example, if the detected voltage potential is lower than the reset signal trigger point, then power on control unit 335 may provide an active output signal, while if the detected power level is higher than the reset signal trigger point, then power on control unit 335 may provide an inactive output signal. An active output from power on control unit 335 may be used to turn off transistor 325, turning off the read/write path to capacitor 320. Power on control unit 335 may be applicable with the first action that may be needed for ensuring that the volatile information persists for the desired persistence time as discussed previously. FIG. 4b is a diagram of power on control unit 335.

Referring back now to FIG. 3, data keep control system 310 also includes a logic gate 340. Logic gate 340 may be used to combine outputs from storage node detection unit 330 and power on control unit 335 into a single signal that may be used to control transistor 325. The output of logic gate 340 may be referred to as a write line (WL) signal. Preferably, logic gate 340 is a NAND gate. However, other combinatorial logic gates may be used in place of the NAND gate. Actual gates used may be dependent on the nature of the outputs of storage node detection unit 330 and power on control unit 335 (for example, active high or active low), transistor 325 type (such as N-type or P-type FET), and so forth.

Data keep control system 310 also optionally includes a refresh signal that allows for the refreshing of the volatile data stored in capacitor 320. A refresh signal on signal line 345 may also be input to logic gate 340. For example, when the refresh signal is active, then transistor 325 may be turned on, turning on the read/write path to capacitor 320 and allowing the volatile data stored in capacitor 320 to be refreshed.

Data read/write system 315 includes a sense amplifier 350 that may be used to read the volatile information stored in capacitor 320 or write the volatile information to capacitor 320. Sense amplifier 350 may detect a change in voltage potential or current magnitude on a data line (such as the read/write path to capacitor 320) after capacitor 320 is coupled to the data line and may determine a value of the volatile information stored in capacitor 320.

Figure 4C:
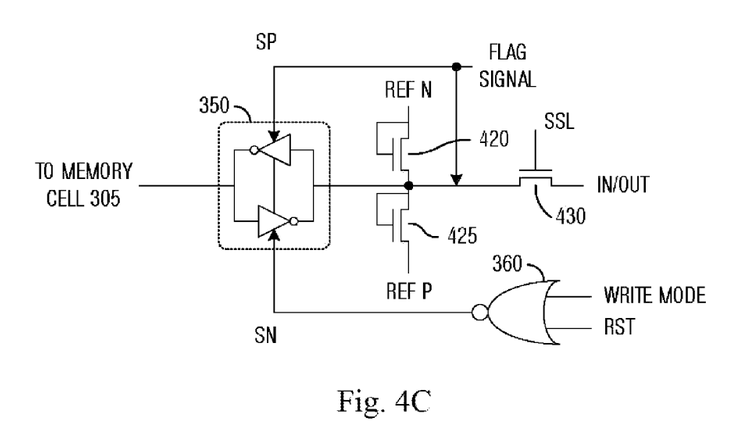
FIG. 4c is a diagram of a sense amplifier.

FIG. 4c is a diagram of sense amplifier 350 and attendant circuitry to read (and write) volatile information from (and to) memory cell 305. As shown in FIG. 4c, a pair of serially arranged diode-connected FETs (NFET 420 and NFET 425, for example) to help with the reading and writing of the volatile information in memory cell 305 via a data in/out line and to perform charge sharing on the data in/out line. The operation of the pair of serially arranged diode-connected FETs will be described in detail below. Transistor 430, preferably an NFET, controlled by control signal "SSL," may be used to couple sense amplifier 350 to the data in/out line for providing the volatile information for writing purposes and for extracting the volatile information for reading purposes.

Referring back now to FIG. 3, data read/write system 315 also includes a level shifter/power switch unit 355 that may be used to provide multiple supply voltage levels (for example, VDD at about 0.7 V and VPP at about 2.0 V) to sense amplifier 350. The supply voltage provided by level shifter/power switch 355 may be provided to an input inverter of sense amplifier 350 and may be referred to as sense amplifier positive (SP) enable signal. Level shifter/power switch unit 355 may also be used to provide power to logic gate 340. Level shifter/power switch 355 may have as input, the volatile information from a digital section of the passive RFID tag.

The supply voltage level provided to sense amplifier 350 may be dependent on the value of the volatile information being written to capacitor 320. For example, if the value of the volatile information is a zero (0), then supply voltage VDD may be provided to sense amplifier 350, while if the value is a one (1), then supply voltage VPP may be provided to sense amplifier 350. The use of a higher supply voltage potential when a one (1) is being written to capacitor 320 may help prevent corruption of the volatile information being stored in capacitor 320. Level shifter/power switch unit 355 may also be used to control the power provided to circuit 300. Level shifter/power switch unit 355 may be applicable with the first action that may be needed for ensuring that the volatile information persists for the desired persistence time as discussed previously.

Data read/write system 315 also includes logic gate 360. Logic gate 360 may be used to generate a sense amplifier negative (SN) enable signal, which may be used to enable an output inverter of sense amplifier 350, for example. Logic gate 360 may combine a read/write mode signal from a digital section of the passive RFID tag and the reset signal RST. Preferably, logic gate 360 is a NOR gate. However, other combinatorial logic gates may be used in place of the NOR gate.

Figure 5A:
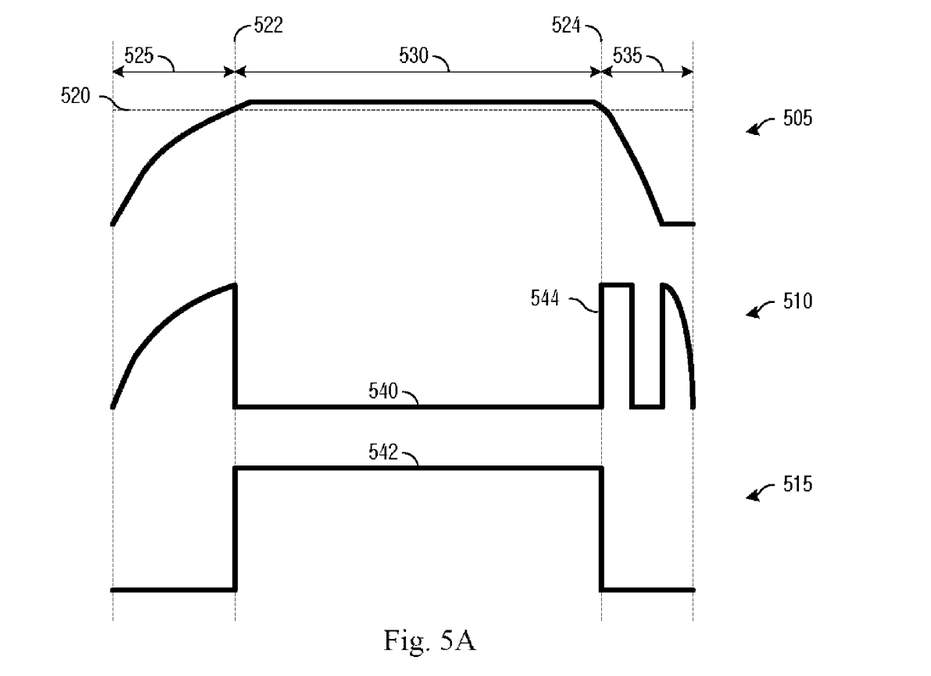
FIG. 5a is a timing diagram of several signals in the circuit of FIG. 3, showing a relationship between a voltage potential of a supply voltage and a reset signal.

FIG. 5a is a timing diagram illustrating signal values of several signals in circuit 300. A first trace 505 represents supply voltage VDD, a second trace 510 represents the reset signal RST (the output of power on control unit 335), and a third trace 515 represents the output of logic gate 340 (WL) that may be used to control the state of transistor 325. The timing diagram illustrates a technique that may be used to help ensure that volatile information stored in capacitor 320 remains safely stored for the desired persistence time is to cut off current leakage paths when power is not being provided to circuit 300.

Power on control unit 335 may assert (or attempt to assert) an active value on the reset signal RST when a supply voltage, such as VDD, is lower than a specified threshold (shown as dashed horizontal line 520 on first trace 505). First trace 505 represents supply voltage VDD as it initially comes on (shown as first interval 525), remains substantially steady for a period of time (shown as second interval 530), and drops (shown as third interval 535). This may be illustrative of a power on-power off cycle of the passive RFID tag as it receives a transmission from an RFID reader, responds to the RFID reader, and then the RFID reader stops transmitting to the passive RFID tag.

During first interval 525, as supply voltage VDD comes on and remains lower than threshold 520, power on control unit 335 asserts an active value on the reset signal RST, which causes transistor 325 to turn off. However, since supply voltage VDD is low and slowly increasing, the reset signal RST is also increasing at a rate that about matches the rate of increase of supply voltage VDD. Once supply voltage VDD reaches and exceeds threshold 520 (shown as vertical dashed line representing time event 522) power on control unit 335 asserts an inactive value on the reset signal RST to turn on transistor 325 (shown as a low value 540 on second trace 510 and as a high value 542 on third trace 515), which it may maintain for the duration of second interval 530.

Then, supply voltage VDD may drop, such as when transmissions are no longer being made to the passive RFID tag, hence power is no longer available to the passive RFID tag. When supply voltage VDD drops below threshold 520, power on control unit 335 asserts an active value on the reset signal RST (shown as pulse 544 in second trace 510) and third trace 515 dropping to a low value. As supply voltage VDD continues to drop, insufficient voltage may be present for power on control unit 335 to operate properly, which may manifest in the form of glitches on second trace 510. By the time that supply voltage VDD drops to about zero, both the reset signal RST and the output of logic gate 340 are also at about zero.

Figure 5B:
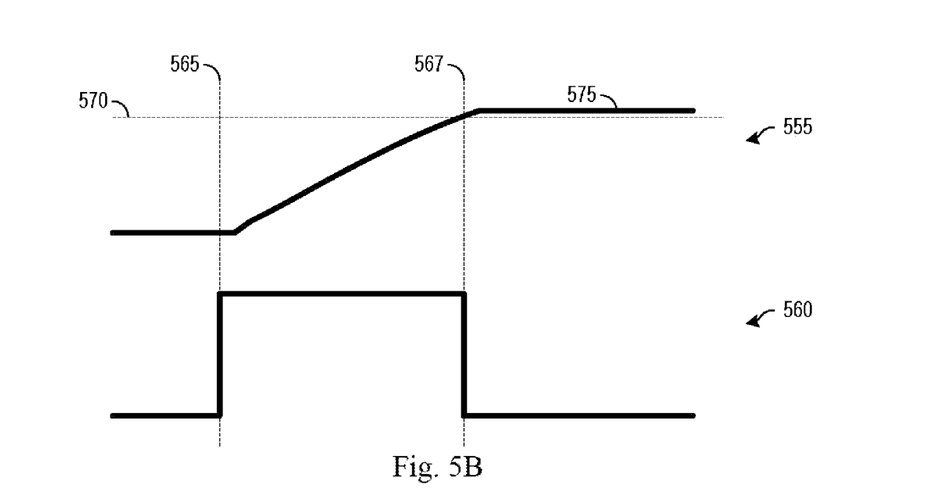
FIG. 5b is a timing diagram of several signals in the circuit of FIG. 3, showing a relationship between an accumulated charge on a memory cell and a state of a pass gate.

FIG. 5b is a timing diagram illustrating signal values of several signals in circuit 300. A first trace 555 represents the voltage potential on capacitor 320 and a second trace 560 represents the output of logic gate 340 (WL) that may be used to control the state of transistor 325. The timing diagram illustrates a technique that may be used to help ensure that volatile information stored in capacitor 320 remains safely stored for the desired persistence time is to cut off current leakage paths when power is not being provided to circuit 300.

As shown in FIG. 5b, at time event 565 (shown as a vertical dashed line) the output of logic gate 340 becomes active, turning on transistor 325, which may enable the storing of a charge on capacitor 320 corresponding to the value of the volatile information. As the charge begins to accumulate on capacitor 320, the voltage potential on capacitor 320 also begins to increase (shown as a monotonically increasing curve on first trace 555).

As the voltage potential on capacitor 320 increases, it is being monitored by storage node detection unit 330. When the voltage potential on capacitor 320 meets and exceeds a threshold representing a desired voltage potential on capacitor 320 (shown as horizontal dashed line 570) at time event 567 (shown as vertical dashed line), storage node detection node 330 asserts an active value on a control signal to indicate that the accumulation of charge on capacitor 320 should stop. With the active value asserted on the control signal, the output of logic gate 340 becomes inactive, turning off transistor 325, and the accumulation of charge (and the increase of the voltage potential) on capacitor 320 stops (shown as flat level 575).

Figure 5C:
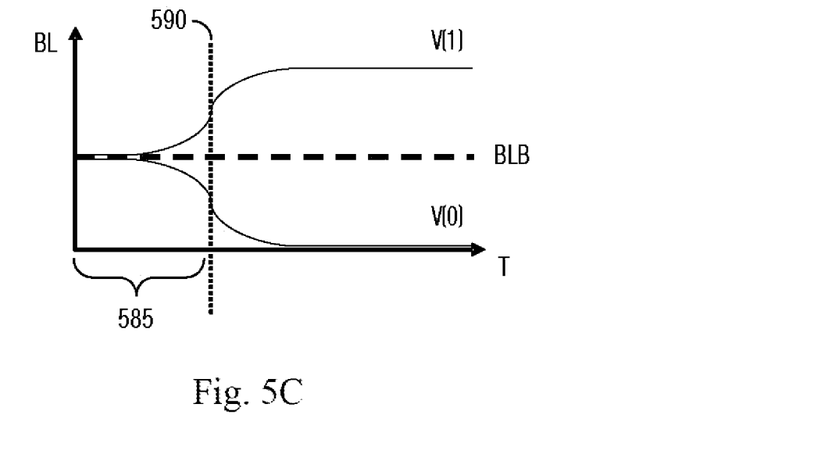
FIG. 5c is a timing diagram of several signals in the circuit of FIG. 3, showing a read operation.

FIG. 5c is a timing diagram illustrating signal values of several signals in circuit 300 while the volatile information is being read from capacitor 320. Prior to reading the volatile information in capacitor 320, a line used to read the volatile information may be precharged to a specified voltage potential (for example, lines labeled BL and BLB in FIG. 4c may be precharged to a voltage potential of about VDD/2). The precharging may last for a period of time shown as interval 585. Then, at time 590 (shown as vertical dashed line), sense amplifier 350 may become enabled. Then, depending on the accumulated charge in capacitor 320, the line labeled BL may change. For example, if capacitor 320 is storing a zero (0), then the voltage potential of the line BL may be provided to capacitor 320 causing a drop in the voltage potential of the line BL, while if capacitor 320 is storing a one (1), then the accumulated charge on capacitor 320 may accumulate on the line BL causing an increase in the voltage potential of the line BL. Since the line BLB is connected to a dummy memory cell, its voltage potential remains substantially unchanged at about VDD/2.

Figure 6:
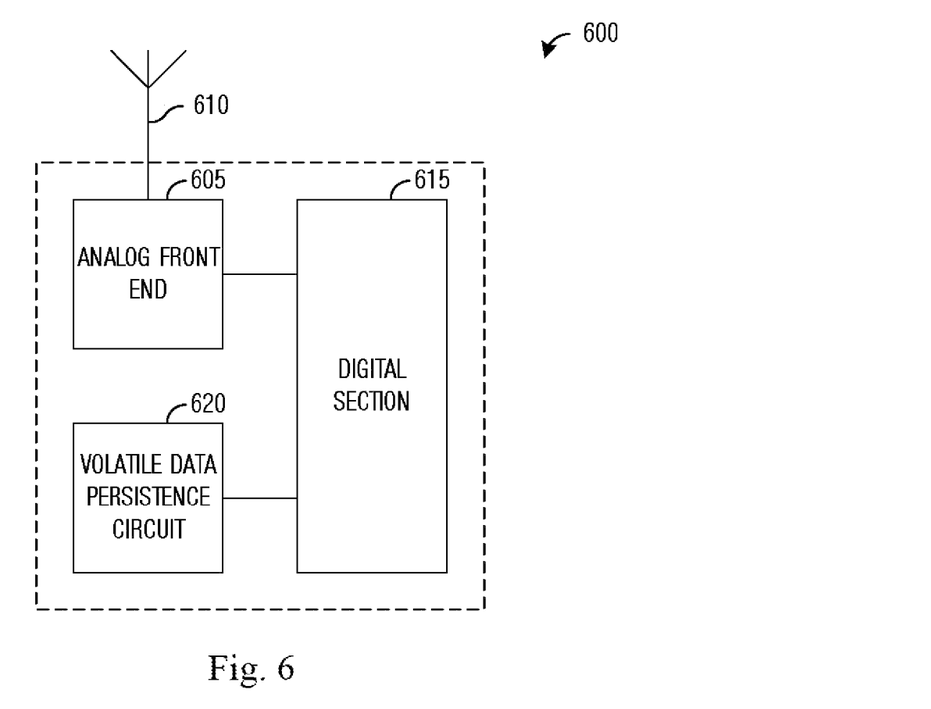
FIG. 6 is a diagram of a passive RFID tag.

FIG. 6 is a diagram of a passive RFID tag 600. Passive RFID tag 600 includes an analog front end 605 that may be responsible for performing analog processing on signals received by an antenna 610 and signals transmitted by antenna 610. Analog processing includes rectifying the received signal to derive power for passive RFID tag 600, demodulating the received signal, modulating the transmitted signal, filtering, amplifying, analog-to-digital conversion, digital-to-analog conversion, and so forth. Furthermore, analog front end 605 may be responsible for deriving supply voltages, such as VDD and VPP, from the received signals.

Passive RFID tag 600 also includes a digital section 615 that may be used to perform tasks such as responding to information requests from an RFID reader, computing values in response to requests, computing volatile information, and so forth. The volatile information may be stored in a volatile data persistence circuit 620 that may be capable of preserving the volatile information a specified persistence time. Volatile data persistence circuit 620 may be an implementation of circuit 300 discussed previously, for example.

Figure 7A:
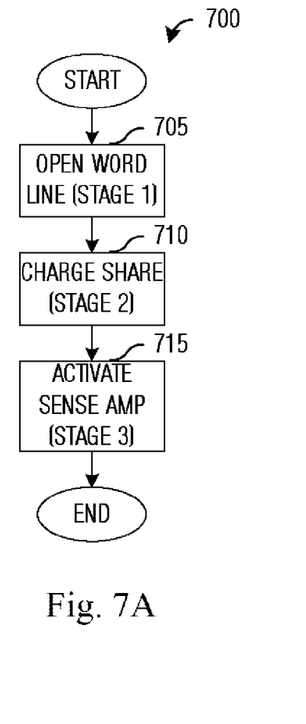
FIG. 7a is a flow diagram of the operation of a data read/write system.

FIG. 7a is a flow diagram 700 illustrating a high level view of the operation of data read/write system 315. The operation of data read/write system 315 may be broken down into multiple stages, which may be similar to the operation of a typical dynamic random access memory cell. The operation may begin with a first stage (stage 1), which may comprise opening of a word line to memory cell 305 (block 705). A second stage of the operation includes charge sharing on the word line (block 710) and a third stage includes activating a sense amplifier, such as sense amplifier 350, to read or write to memory cell 305 (block 715). Once the read or write to memory cell 305 completes, the operation of data read/write system 315 may terminate.

Figure 7B:
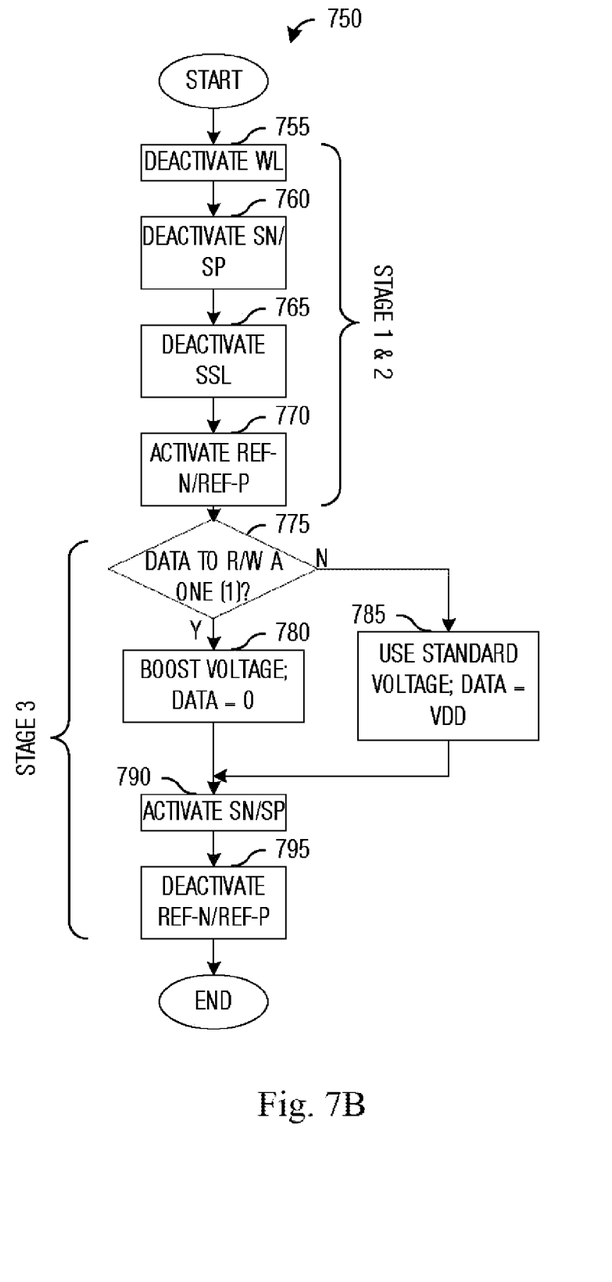
FIG. 7b is a flow diagram of the operation of a data read/write system.

FIG. 7b is a flow diagram 750 illustrating a detailed view of the operation of data read/write system 315. As stated above, the operation of data read/write system 315 may occur in stages, however, the stages do not have to be mutually exclusive. Stage 1 (opening word line (block 705 of FIG. 7a)) and stage 2 (charge sharing (block 710 of FIG. 7a)) may occur at about the same time and may include deactivating (turning off) control signal "WL" that may be used to control transistor 325 (block 755); deactivating the SP/SN enable control signals to deactivate sense amplifier 350 (block 760); deactivating control signal "SSL" that may be used to control transistor 430 (block 765); and activating REF-N/REF-P reference voltage supplies (block 770).

Once charge sharing (stage 2) completes, stage 3 (activate sense amplifier (block 715 of FIG. 7a)) may occur. Activating a sense amplifier may include performing a check to determine if a one (1) or a zero (0) is being written to capacitor 320 (block 775). If a one (1) is being written, then a supply voltage used in the writing operation may be boosted (provided at electrical node SP as shown in FIG. 4c) and a zero voltage potential (such as substrate ground) may be used on the data in/out line (block 780).

Increasing the supply voltage used in the writing operation may help ensure the integrity of the one (1) being written to capacitor 320. Boosting the supply voltage may involve using supply voltage VPP rather than supply voltage VDD, with a difference potentially being about 2.0V for the supply voltage VPP and 0.7 V for the supply voltage VDD. Level shifter/power switch 355 may be used to provide the boosted supply voltage.

If a zero (0) is being written, then it may not be necessary to boost the supply voltage and the supply voltage VDD may be used and a high voltage potential (such as VDD) may be used on the data input (block 785). Level shifter/power switch 355 may also provide the supply voltage VDD for the situation when the boosted supply voltage is not needed.

After selecting the supply voltage based on the value being written to capacitor 320, sense amplifier 350 may be activated. Activating sense amplifier 350 may be accomplished by activating SP/SN enable control signals (block 790). Additionally, REF-N/REF-P reference voltage supplies may be deactivated (block 795). Once the volatile data has been read from or written to capacitor 320, the operation of data read/write system 315 may terminate.

Figure 8:
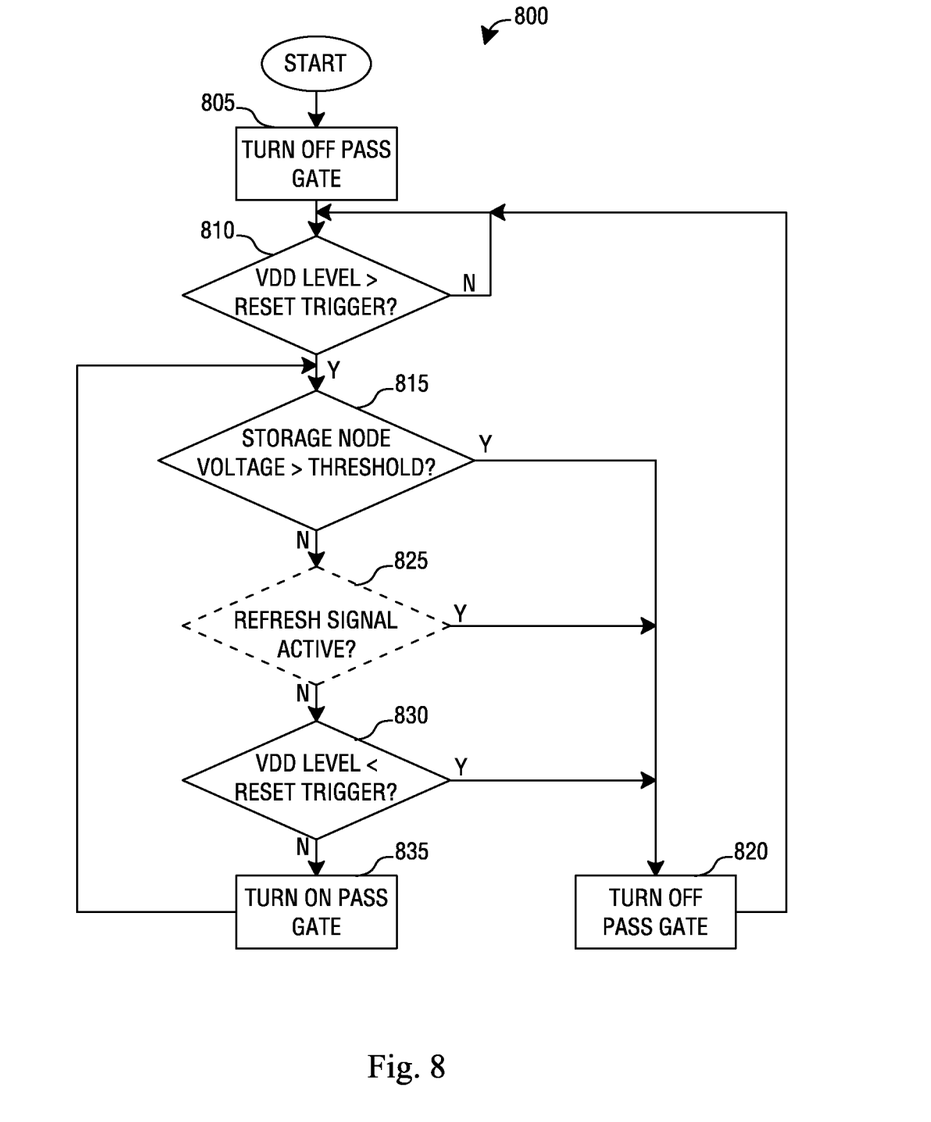
FIG. 8 is a flow diagram of an algorithm for use in controlling the state of a pass gate.

FIG. 8 is a flow diagram 800 illustrating the control of the state of transistor 325. As discussed previously, the state of transistor 325 may depend on several factors, including voltage potential of supply voltage VDD, voltage potential on capacitor 320, state of the refresh signal, whether or not there is volatile information to write or read, and so forth. Flow diagram 600 may be descriptive of the control of the state of transistor 325 while circuit 300 is in normal operation mode and may begin when the passive RFID tag comes within range of an RFID reader.

The control of the state of transistor 325 may begin by turning off transistor 325 (block 805). By ensuring that transistor 325 is turned off, the maximum persistence time of the volatile information stored in capacitor 320 (if any) is ensured. This may be a default condition of circuit 300, to help ensure a maximization of the persistence time of the volatile information stored in capacitor 320. Then, a check may be performed to determine if the voltage potential of the supply voltage VDD is greater than the reset threshold for the reset signal RST (block 810). If the voltage potential of the supply voltage VDD is not greater than the reset threshold, then although power may be applied to the passive RFID tag, not enough time has elapsed to allow for the supply voltage VDD to stabilize at a voltage potential higher than the reset threshold. Therefore, progress should stop until the voltage potential of the supply voltage VDD rises above the reset threshold.

Once the voltage potential of the supply voltage VDD rises above the reset threshold (block 810), a comparison may be performed to determine if the voltage potential on capacitor 320 is greater than a voltage potential threshold (block 815). Checking the voltage potential on capacitor 320 with the voltage potential threshold may determine if adequate charge has accumulated on capacitor 320. If sufficient charge has accumulated on capacitor 320 to meet the desired persistence time, then there is no need to accumulate additional charge and transistor 325 may be turned off (block 820). By minimizing the time that transistor 325 is turned on, the probability of power loss occurring while there is a current leakage path is available may be reduced.

This may be followed by an optional comparison that may determine if the refresh signal is active (block 825). If the refresh signal is active, then transistor 325 should be turned off (block 820). However, if the refresh signal is inactive, then transistor 325 may be turned on. Another comparison may be made to determine if the voltage potential of the supply voltage VDD is less than the reset threshold (block 830). If the voltage potential of the supply voltage VDD is not less than the reset threshold, then transistor 325 may be turned on (block 835), but if the voltage potential of the supply voltage VDD is less than the reset threshold, then transistor 325 should be turned off (block 820). After turning on transistor 325, the control of the state of transistor 325 may return to block 815 to repeat the comparisons to determine if it is necessary to change the state of transistor 325.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a radio frequency identification (RFID) tag, the method comprising:
    measuring a voltage potential of a supply voltage of the RFID tag;
    turning on a pass gate in response to determining that the voltage potential is greater than a first threshold, wherein the pass gate selectively couples a memory cell of the RFID tag to a data line used for reading or writing of data, and wherein the supply voltage is based on a data value of the data to be written to the memory cell;
    measuring an accumulated charge on the memory cell;
    setting a control signal to a logical combination of a first signal based on the voltage potential and a second signal based on the accumulated charge; and
    turning off the pass gate in response to determining that the control signal is equal to a true value.

2. The method of claim 1, further comprising, leaving the pass gate on in response to determining that the control signal is equal to a false value.

3. The method of claim 1, further comprising prior to measuring the voltage potential, turning off the pass gate.

4. The method of claim 1, wherein setting the control signal comprises:
    setting the control signal to a false value; and
    setting the control signal to the true value in response to determining that the voltage potential is less than the first threshold or that the accumulated charge is greater than a second threshold.

5. The method of claim 4, wherein setting the control signal to the true value comprises logically NAND-ing a result of a comparison of the voltage potential to the first threshold and a result of a comparison of the accumulated charge to the second threshold.

6. The method of claim 1, further comprising, repeating measuring the voltage potential, turning on the pass gate, measuring the accumulated charge, and turning off the pass gate.

7. A radio frequency identification (RFID) tag, the RFID tag comprising:
    an analog front end configured to process signals received by an antenna, and to derive power for the RFID tag from received signals;
    a digital section coupled to the analog front end, the digital section configured to provide computational operations; and
    a data persistence circuit coupled to the digital section, the data persistence circuit configured to preserve data stored therein for a duration without power, the data persistence circuit configured to couple a memory store in the data persistence circuit to a data line used for reading or writing of data based on an output signal of a logic gate, the logic gate receiving a first input signal based on a voltage potential of a supply voltage of between about 0.7 V to about 2.0 V provided by a level shifter and a second input signal based on an accumulated charge in the memory store.

8. The RFID tag of claim 7, wherein the data persistence circuit comprises:
    a memory cell configured to store information;
    a data read/write system unit selectively coupled to the memory cell, the data read/write system unit configured to write information to the memory cell, to read information from the memory cell, and to provide the supply voltage at the voltage potential based on a value of information being written to the memory cell; and
    a data keep control system unit coupled to the memory cell and to the data read/write system unit, the data keep control system unit configured to generate a control signal to selectively couple the data read/write system unit to the memory cell, wherein the generation of the control signal is based on the voltage potential of the supply voltage and the accumulated charge on the memory cell.

9. The RFID tag of claim 8, wherein the data read/write system unit is further configured to:
    set, with the level shifter, the supply voltage for a data writing mechanism based on the value of the information being written;
    set, with the level shifter, a data voltage for the data writing mechanism based on the value of the information being written; and
    enable the data writing mechanism to write the information based on a read/write mode signal and a reset signal.

10. The RFID tag of claim 9, wherein the information may have one of two values, and wherein a first supply voltage level of the supply voltage is used for the data writing mechanism for a first information value and a second supply voltage level of the supply voltage is used for the data writing mechanism for a second information value.

11. The RFID tag of claim 10, wherein the first information value is a one (1) and the second information value is a zero (0), and wherein the first supply voltage level has a higher voltage potential than the second supply voltage level.

12. The RFID tag of claim 11, wherein the data voltage is about equal to substrate ground when the information is equal to a one (1) and a high voltage potential when the information is equal to a zero (0).

13. The RFID tag of claim 9, wherein the data read/write system unit is further configured to enable charge sharing in the data writing mechanism.

14. The RFID tag of claim 8, wherein the memory cell comprises:
  a capacitor to store the information; and
  a transistor having a channel coupled in between the capacitor and the data read/write system unit, and a gate terminal coupled to the data keep control system, the transistor to selectively couple the capacitor to the data read/write system unit.

15. The RFID tag of claim 14, wherein the transistor is a field effect transistor (FET) with a high threshold voltage.

16. The RFID tag of claim 8, wherein the data keep control system unit comprises:
  a storage node detection unit coupled to the memory cell, the storage node detection unit configured to detect an amount of accumulated charge in the memory cell;
  a power on control unit configured to measure a voltage potential of a supply voltage; and
  a first logic unit coupled to the storage node detection unit and to the power on control unit, the first logic unit configured to generate the control signal by combining outputs from the storage node detection unit and the power on control unit.

17. The RFID tag of claim 16, wherein the first logic unit comprises a logical NAND gate having a first input coupled to the output of the storage node detection unit and a second input coupled to the output of the power on control unit.

18. The RFID tag of claim 8, wherein the data read/write system unit comprises:
  a sense amplifier coupled to the memory cell, the sense amplifier configured to determine information stored in the memory cell and to write information to the memory cell;
  the level shifter coupled to the sense amplifier, the level shifter configured to selectively provide the supply voltage at the potential that is based on the value of the information being written to the memory cell; and
  a second logic unit coupled to the sense amplifier and to the data keep control system unit, the second logic unit configured to generate an enable signal for the sense amplifier based on an operating mode for the circuit and the control signal produced by the data keep control system unit.

19. The RFID tag of claim 18, wherein the second logic unit comprises a logical NOR gate having a first input coupled to the data keep control system and a second input coupled to an operating mode signal line.

20. The RFID tag of claim 18, wherein the data read/write system unit further comprises:
  a first diode connected field effect transistor (FET) having its channel coupled between a first reference voltage supply and the data line; and
  a second diode connected FET having its channel coupled between the data line and a second reference voltage supply.

* * * * *